United States Patent
Efrati

(10) Patent No.: US 11,009,948 B2
(45) Date of Patent: May 18, 2021

(54) TRANSCEIVER NETWORK FABRIC COMPRISING MICRO-MAGNETS AND MICRO-COILS

(71) Applicant: WOOJER LTD., Elad (IL)

(72) Inventor: Mor Efrati, Givat Yishayahu (IL)

(73) Assignee: WOOJER LTD., Elad (IL)

( * ) Notice: Subject to any disclaimer, the term of this patent is extended or adjusted under 35 U.S.C. 154(b) by 0 days.

(21) Appl. No.: 15/552,583

(22) PCT Filed: Mar. 6, 2016

(86) PCT No.: PCT/IL2016/050252
§ 371 (c)(1),
(2) Date: Aug. 22, 2017

(87) PCT Pub. No.: WO2016/147171
PCT Pub. Date: Sep. 22, 2016

(65) Prior Publication Data
US 2018/0052516 A1 Feb. 22, 2018

Related U.S. Application Data

(60) Provisional application No. 62/132,647, filed on Mar. 13, 2015.

(51) Int. Cl.
*G06F 3/01* (2006.01)
*D06C 3/00* (2006.01)
(Continued)

(52) U.S. Cl.
CPC ........... *G06F 3/014* (2013.01); *D03D 1/0088* (2013.01); *D03D 15/00* (2013.01); *D06C 3/00* (2013.01);
(Continued)

(58) Field of Classification Search
CPC .......... G06F 3/014; G06F 3/016; G06F 1/163; G06F 3/011; G06F 3/018; D03D 1/0088;
(Continued)

(56) References Cited

U.S. PATENT DOCUMENTS 8,701,578 B2 * 4/2014 Chung .................. A41D 1/005
112/439
8,952,888 B2 * 2/2015 Van Den Eerenbeemd ................
G06F 3/016
345/156

(Continued)

FOREIGN PATENT DOCUMENTS

WO WO-2012028973 A1 * 3/2012 ............... H04R 3/12

OTHER PUBLICATIONS

Kickstarter.com,, Woojer—Born to Feel, https://www.kickstarter.com/projects/1382889335/woojer-feel-the-sound (Year: 2013).*
(Continued)

*Primary Examiner* — Alexander Eisen
*Assistant Examiner* — Nathaniel P Brittingham
(74) *Attorney, Agent, or Firm* — Robert G. Lev

(57) ABSTRACT

A fabric comprising micro-magnets, micro-coils of conductive material within an electric-insulating coating and an array of switches for selectively switching micro-coils on and off, such that relative movement of the micro-coils with respect to a local magnet field generates signals that are transmittable to a receiver, and signals received can switch coils on to detect relative movement of the coil with respect to nearby magnets to create tension and compression within the fabric.

14 Claims, 2 Drawing Sheets

(51) Int. Cl.
  *D03D 1/00* (2006.01)
  *D03D 15/00* (2021.01)
  *A41D 1/00* (2018.01)
  *A41D 1/04* (2006.01)
  *A41D 19/00* (2006.01)

(52) U.S. Cl.
  CPC .............. *G06F 3/011* (2013.01); *G06F 3/016* (2013.01); *G06F 3/018* (2013.01); *A41D 1/005* (2013.01); *A41D 1/04* (2013.01); *A41D 19/0024* (2013.01); *D10B 2401/16* (2013.01); *D10B 2401/18* (2013.01); *D10B 2501/041* (2013.01)

(58) Field of Classification Search
  CPC ........... D03D 15/00; D03D 2700/0166; A41D 1/002; A41D 1/04; A41D 1/005; D06C 3/00; D10B 2401/046; D10B 2401/16; D10B 2401/18; D10B 2401/041
  See application file for complete search history.

(56) References Cited

U.S. PATENT DOCUMENTS

| | | | | |
|---|---|---|---|---|
| 8,995,692 | B2* | 3/2015 | Efrati | H04R 3/12 |
| | | | | 381/151 |
| 9,058,728 | B2* | 6/2015 | Fantauzza | G08B 6/00 |
| 9,338,915 | B1* | 5/2016 | Liu | H05K 1/18 |
| 9,817,440 | B2* | 11/2017 | Longinotti-Buitoni | |
| | | | | A61B 5/6804 |
| 9,911,292 | B1* | 3/2018 | Khoshkava | H02J 7/02 |
| 10,019,912 | B2* | 7/2018 | Eagleman | G06F 3/016 |
| 2004/0207542 | A1* | 10/2004 | Chang | G06F 1/1626 |
| | | | | 341/20 |
| 2005/0132290 | A1* | 6/2005 | Buchner | G06F 1/163 |
| | | | | 715/702 |
| 2006/0132433 | A1* | 6/2006 | Kramer | G06F 3/016 |
| | | | | 345/156 |
| 2010/0141407 | A1* | 6/2010 | Heubel | G06F 1/163 |
| | | | | 340/407.1 |
| 2010/0154102 | A1 | 6/2010 | Leung | |
| 2011/0197333 | A1 | 8/2011 | Liotta | |
| 2011/0282164 | A1* | 11/2011 | Yang | A61B 5/01 |
| | | | | 600/301 |
| 2012/0033837 | A1* | 2/2012 | Mitsui | H04R 1/005 |
| | | | | 381/191 |
| 2012/0238923 | A1 | 9/2012 | Yamashita | |
| 2013/0155020 | A1* | 6/2013 | Heubel | H04B 5/0031 |
| | | | | 345/174 |
| 2013/0214913 | A1* | 8/2013 | Efrati | H04R 3/12 |
| | | | | 340/407.1 |
| 2014/0132410 | A1* | 5/2014 | Chang | G06F 3/014 |
| | | | | 340/539.11 |
| 2014/0348348 | A1* | 11/2014 | Efrati | H04R 3/12 |
| | | | | 381/162 |
| 2015/0022328 | A1* | 1/2015 | Choudhury | G06F 3/04847 |
| | | | | 340/12.5 |
| 2015/0073318 | A1* | 3/2015 | Holschuh | B64G 6/00 |
| | | | | 601/84 |
| 2015/0156581 | A1* | 6/2015 | Efrati | H02K 33/16 |
| | | | | 381/98 |
| 2015/0219078 | A1* | 8/2015 | Li | H02N 11/006 |
| | | | | 310/306 |
| 2015/0277563 | A1* | 10/2015 | Huang | G06F 3/016 |
| | | | | 715/702 |
| 2016/0274662 | A1* | 9/2016 | Rimon | G06F 3/014 |
| 2016/0337734 | A1* | 11/2016 | Efrati | H04R 1/026 |
| 2018/0052516 | A1* | 2/2018 | Efrati | G06F 3/014 |
| 2018/0081439 | A1* | 3/2018 | Daniels | G06F 1/163 |
| 2018/0190087 | A1* | 7/2018 | Maalouf | G08B 6/00 |

OTHER PUBLICATIONS

Evangelho, Jason, Woojer Is a Wearable Audio Device That May Forever Change How You Experience Music, Film and Video Games, Nov. 6, 2013, Forbes.com (Year: 2013).*

Spence, Ewan, Feel Your Music With Woojer's Wearable Woofer, Dec. 17, 2014, Forbes.com, https://www.forbes.com/sites/ewanspence/2014/12/17/woojer-personal-woofer-music-haptic/#592af2271168 (Year: 2014).*

Benali-Khoudja et al., VITAL: A New Low-Cost VIbro-TActiLe Display System, Apr. 2004, Proceedings of the 2004 IEEE International Conference on Robotics & Automation, p. 721-726 (Year: 2004).*

* cited by examiner

TRANSCEIVER NETWORK FABRIC COMPRISING MICRO-MAGNETS AND MICRO-COILS

PRIORITY INFORMATION

The present application claims priority as a National Stage Entry of PCT/IL2016/050252, filed on Mar. 6, 2016. The present invention also claims priority to U.S. Provisional Patent Application No. 62/132,647, filed on Mar. 13, 2015.

BACKGROUND OF THE INVENTION

Gloves and other garments with movement sensors are known. Such garments may be used in virtual or augmented reality systems, for example. The underlying technology may vary somewhat.

The present invention is directed to a fabric with in-built movement transducers.

SUMMARY OF THE INVENTION

A first aspect of the invention is directed to a fabric comprising a knit or weave of fibers, an array of micro-magnets attached to the fibers, micro-coils of conductive material within an electric-insulating coating and an array of switches for selectively switching said micro-coils on and off, the micro-coils in electronic communication with a transceiver such that relative movement of the micro-coils with respect to a local magnet field generates signals that are transmittable to a receiver.

Optionally, the array of micro-coils are hard wired to the transceiver.

Optionally, the hard wires are woven or knitted into the fabric.

Optionally, the fabric comprises the hard wires.

Preferably, the hard wires comprise a non-ferrous metal.

Preferably, the micro-coils comprise a non-ferrous metal.

In some embodiments, each of micro-coil transmits information to the transceiver, such that said signal comprises an address for locating the micro-coil and an induced signal generated within the micro-coil by relative movement to the magnet field.

Preferably, the fabric is bidirectional, such that signals received by the transceiver can activate the micro-coils to create a signal that generates movement of the coil with respect to nearby magnets to create tension and compression within the fabric.

A second aspect is directed to a method of generating signals relating to relative movement with a cloth, the method comprising the steps of:

(i) attaching an array comprising a plurality of micro-magnets and micro-coils to the cloth;

(ii) inducing a micro-current within at least one micro-coil by relative movement of the at least one micro-coil with respect to a local magnetic field associated with nearby micro-magnets, and (iii) transmitting to a transceiver, the signal corresponding to the micro-current together with an address of the micro-coil for locating the micro-coil with respect to its surroundings.

In some embodiments, the micro-current is transmitted to the transceiver 20 over a wire and in some embodiments, the micro-current is transmitted to the transceiver by a wireless transmitter.

The vibrations may be force feedback directional signals giving a sensation of momentum and directional force. Although particularly useful for sensing bass frequency vibrations and infra sound, the range of frequencies that may be detected is very wide, and by changing the dimensions of the transducer, it may be tailored for these and other specific ranges. Indeed, by careful selection of the components of the transducer, including the mass and magnetic power of the magnets and the dimensions and number of coils of the solenoids, each transducer may be optimized for specific purposes or special effects.

The term micro as used herein is used rather loosely and may include components within a range of sizes, up to and including about 10 mm, for example.

DESCRIPTION OF FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF EMBODIMENTS

An embodiment of the present invention is directed to a fabric that comprises magnets positioned periodically within the weave or knit, and coated coils of conductive material with associated micro-switches threaded through the weave or knit, or comprising the fibers of the fabric itself.

The micro-switches may be activated via connecting wires or remotely and used to couple and decouple the coils individually to a signal transceiver (transmitter-receiver) that is coupled to a processing means such as a microprocessor and to a display means which may be a second fabric.

Due to the Faraday effect by which movement of wires in a magnetic field can induce signals and signals through a wire within a magnetic field can induce current, the fabric is bi-directional.

Relative movement of fibers with respect to the magnets may generate signals that may be transmitted via the transceiver to an imaging device or to a second fabric to create a sensation of movement. Such signals are generally complex waveforms, where symmetrical parts are sensed as vibrations and asymmetrical parts are felt as directional tugs. Similarly, signals transmitted to the fabric can create vibrations, tugs, pushes and pulls that can be sensed by a wearer.

Where the fabric is worn as a glove, for example, the movement of the wearer can cause the fabric to flex and generate signals that may be sensed remotely. Similarly, signals may be transmitted to provide a virtual sensation of movement to the wearer.

Figure 1:
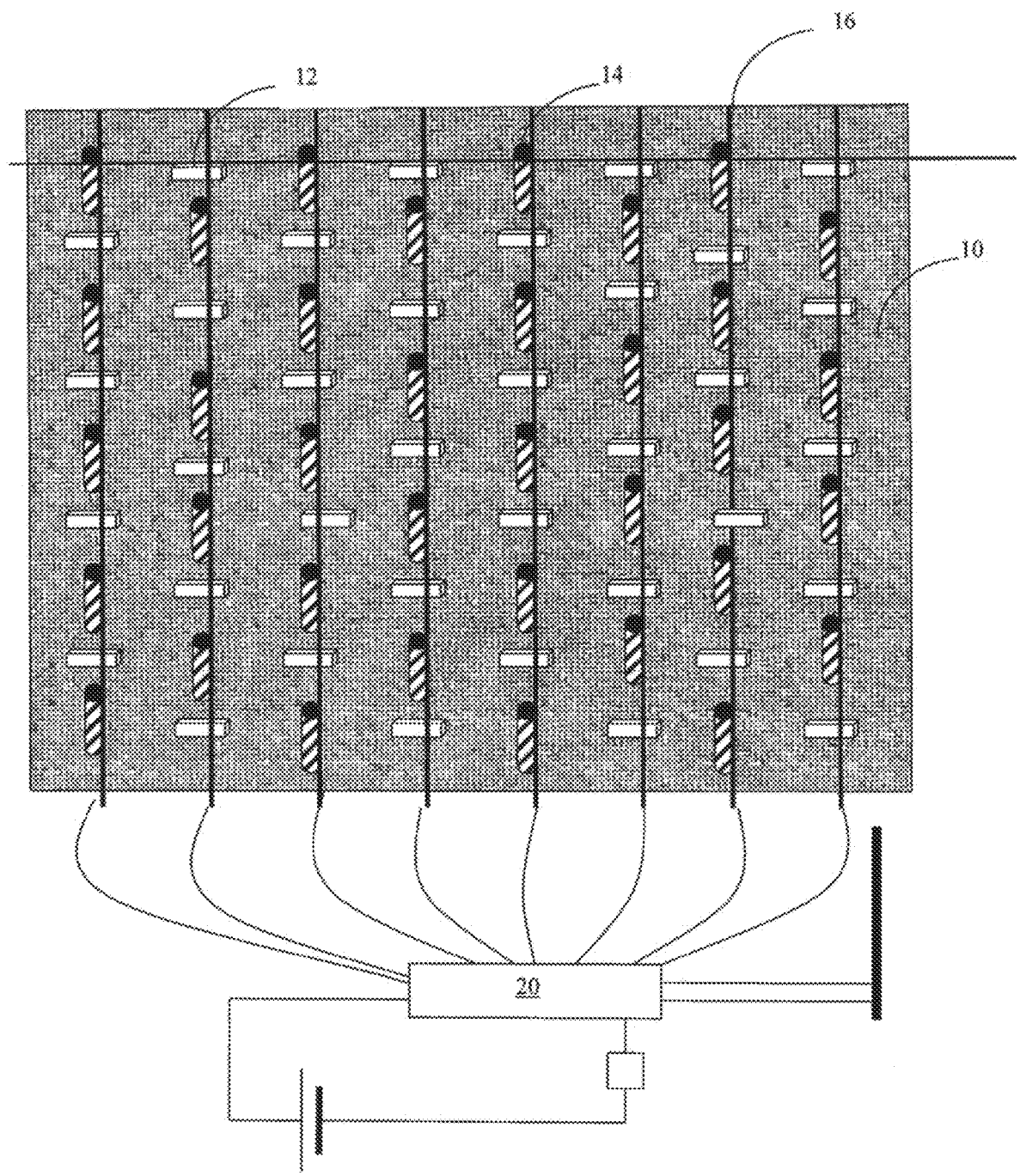
FIG. 1 is a schematic illustration of a fabric with embedded magnets and solenoids.

With reference to FIG. 1, a cloth 10 comprising a weave of fibers is shown. The cloth may, alternatively, comprise a knit of fibers or a felt, and may be a continuous, non fibrous fabric such as natural or artificial leather, rubber or polymer sheet. The cloth 10 comprises an array of micro-magnets 12 attached to the fabric or woven into the fabric, micro-coils 14 of conductive material within an electric-insulating coating and an array of switches for selectively switching the micro-coils 12 on and off, the micro-coils are in electronic communication with a transceiver 20 such that relative movement of the micro-coils 14 with respect to a local magnet field in consequence of the micro-magnets 12 generates signals that are transmittable to a receiver.

In some embodiments, the micro-coils 14 are hard wired to the transceiver 20 by micro-wires 16. Each micro-coil 14 transmits information to the transceiver 20, such that the signal comprises an address for locating the micro-coil within the array, and an induced signal induced within the micro-coil by relative movement to the magnet field, by what is sometimes called the dynamo effect.

Preferably the micro-coils 14 themselves are fabricated from a non-ferrous metal, such as copper and are not attracted to the micro-magnets 12.

Similarly, where the micro-coils 14 are hard-wired by micro-wires 16, the micro-wires 16 comprise a non-ferrous metal, typically within an insulated sheath comprising polymer, for example, and are not attracted to the micro-magnets 12.

It will be noted that the signals received by the transceiver 20 can activate the micro-coils 14 to create a signal that generates movement of a micro-coil 14 with respect to nearby magnets 12 to create tension and compression within the fabric 10. In some embodiments, the micro-coils are sensitive to directional movement and can create forced feedback.

Figure 2:
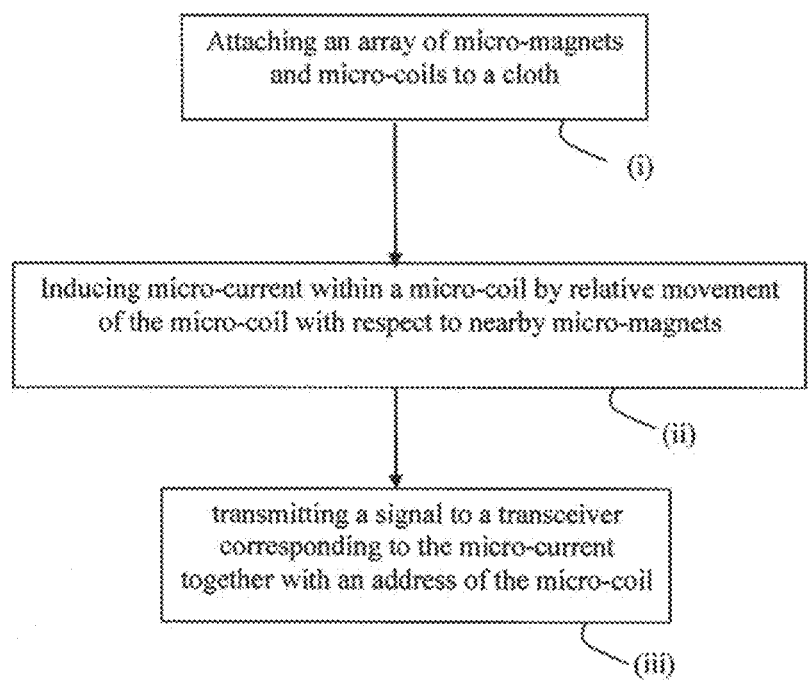
FIG. 2 is a flowchart of a method of the invention.

With reference to FIG. 2, a method of generating signals relating to relative movement with a cloth 10 is shown. The method comprising the steps of: (i) attaching an array comprising a plurality of micro-magnets 12 and micro-coils 14 to the cloth 10; (ii) inducing a micro-current within at least one micro-coil 16 by relative movement of the at least one micro-coil 16 with respect to a local magnetic field associated with nearby micro-magnets 12, and (iii) transmitting a signal to a transceiver 20, the signal corresponding to the micro-current together with an address of the micro-coil 16 for locating the micro-coil 16 with respect to its surroundings.

In some embodiments, the micro-current is transmitted to the transceiver 20 over a wire 16 and in some embodiments, the micro-current is transmitted to the transceiver 20 by a wireless transmitter. The vibrations may be force feedback directional signals giving a sensation of momentum and directional force. Although particularly useful for sensing bass frequency vibrations and infra sound, the range of frequencies that may be detected is very wide, and by changing the dimensions of the transducer, it may be tailored for these and other specific ranges. Indeed, by careful selection of the components of the transducer, including the mass and magnetic power of the magnets and the dimensions and number of coils of the solenoids, each transducer may be optimized for specific purposes or special effects.

Thus embodiments of this invention may be used for enhancing the audible experience, creating an immersive experience or an experience of virtual reality, for example.

It will be appreciated that the cloth of the invention may be a glove, sweater or other garment. In this manner, movement of one person may be transmitted and sensed by a second person.

Several embodiments of the present invention have been described. Nevertheless, it will be understood that various modifications may be made without departing from the spirit and scope of the invention. Accordingly, other embodiments are within the scope of the following claims.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A system for tactile sensing and stimulation comprising:
   a) a fabric;
   b) an array of units attached to the fabric, each unit comprising a micro-magnet and a micro-coil; and
   c) a transceiver;
   wherein relative movement of the micro-coil and the micro-magnet in a unit generates a signal that is sent to the transceiver, the signal comprising data indicative of an address of the unit in the array;
   wherein, upon receipt of a signal from a first one of the units, the transceiver generates an electrical current in the micro-coil of one or more units in a predetermined vicinity of the first unit;
   wherein an electric current in a unit causes relative movement of the micro-coil and the micro-magnet in the unit creating compression in said fabric.

2. The fabric of claim 1 comprising cloth.

3. The fabric of claim 2 comprising a knit, a felt or a weave.

4. The fabric of claim 1 comprising a leather, rubber or plastic.

5. The fabric of claim 1, wherein the micro-coils comprise a non-ferrous metal.

6. The fabric of claim 1, wherein the micro-coils are hard wired to the transceiver.

7. The fabric of claim 6 wherein the hard wires are woven into the fabric.

8. The fabric of claim 6 wherein the hard wires are knitted into the fabric.

9. The fabric of claim 6 wherein the fabric comprises the hard wires.

10. The fabric of claim 6 wherein the hard wires comprise a non-ferrous metal.

11. The fabric of claim 1, wherein each micro-coil transmits information to the transceiver, such that said signal comprises an address for locating the micro-coil and an induced signal generated within the micro-coil by relative movement to the magnet field.

12. A method of operating a tactile stimulation system, said system having a fabric supporting an array of micro-coils and associated micro-magnets, said system also including a switching configuration to control activation of said micro-coils responsive to a transceiver; said improvement comprising the steps of:

a) activating selected micro-coils to induce micro-currents affecting associated micro-magnets; and,
b) inducing relative movement of at least one said micro-coils with respect to an associated micro-magnet thereby directly creating tension and compression within said fabric;
c) detecting relative movement between the micro-coil and the micro-magnet in the unit caused by tension and compression, thereby inducing a signal that is sent to the transceiver, said signal including data indicative of an address of said unit.

13. The method of claim 12 wherein the micro-current is induced responsive to a control signal transmitted to the transceiver over a wire.

14. The method of claim 12 wherein the micro-current is induced responsive to a control signal transmitted to the transceiver by a wireless transmitter.

* * * * *